W. KOUNS.
WAGON BODY CONSTRUCTION.
APPLICATION FILED APR. 26, 1921.

1,429,208.

Patented Sept. 12, 1922.
2 SHEETS—SHEET 1.

WITNESSES
E. A. Wilson
Robert J. Hulsizer

INVENTOR
WESLEY KOUNS
BY Munn & Co
ATTORNEYS

W. KOUNS.
WAGON BODY CONSTRUCTION.
APPLICATION FILED APR. 26, 1921.
1,429,208.
Patented Sept. 12, 1922.
2 SHEETS—SHEET 2.
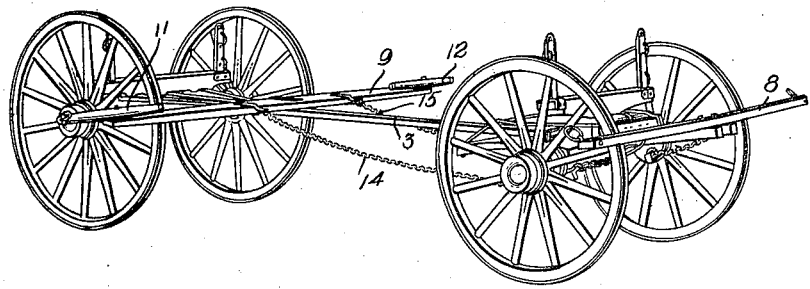
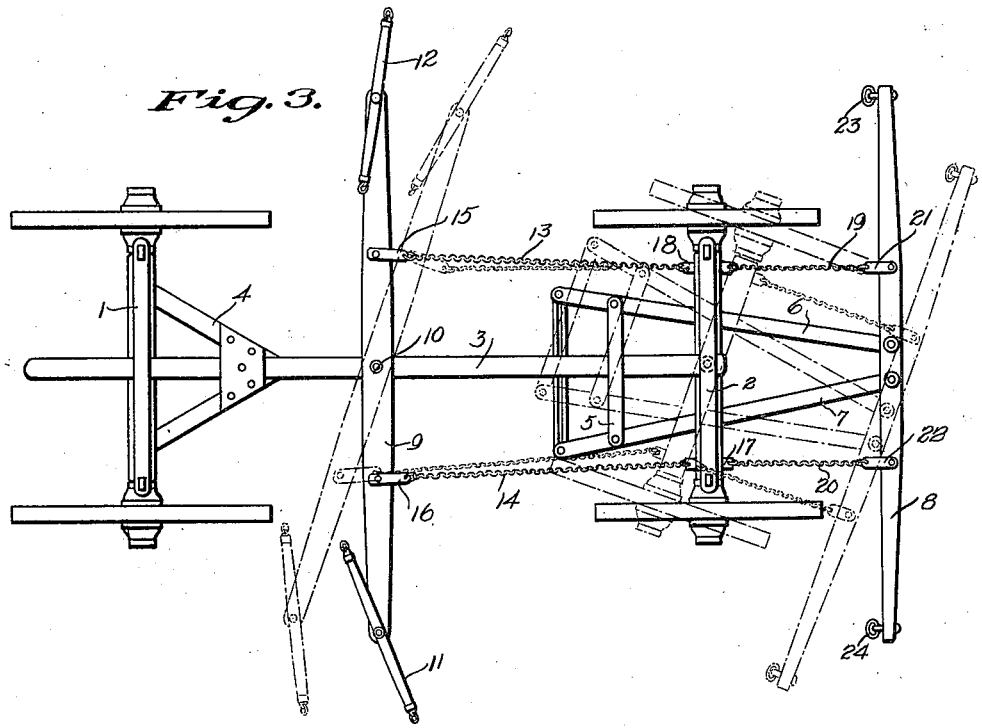
WITNESSES
INVENTOR
WESLEY KOUNS
BY
ATTORNEYS Patented Sept. 12, 1922.

1,429,208

UNITED STATES PATENT OFFICE.

WESLEY KOUNS, OF SALINA, KANSAS.

WAGON-BODY CONSTRUCTION.

Application filed April 26, 1921. Serial No. 464,516.

*To all whom it may concern:*

Be it known that I, WESLEY KOUNS, a citizen of the United States, and a resident of Salina, in the county of Saline and State of Kansas, have invented a new and Improved Wagon - Body Construction, of which the following is a full, clear, and exact description.

This invention relates to wagon body constructions and has particular reference to an improvement in running gear for wagon bodies.

An object of the invention is to provide means whereby the ordinary wagon body can be very readily and simply adapted for use with a team of horses to do the work of two men and to carry a double load.

Another object of the invention resides in the provision of running gear whereby two horses may be disposed along the sides of the wagon, leaving the front and rear of the wagon adapted to use in connection with any farm implements or devices, such as hay rakes.

A further object resides in the provision of specific means whereby one person can operate the team and the wagon easily and efficiently when said wagon is provided with farm devices, such as load carrying devices, at both the front and rear thereof, thus saving a considerable item in time and labor and expense of operation.

A still further object resides in the particular construction of the running gear whereby one operator can guide a team of horses in connection with an ordinary farm wagon to which the improved running gear has been attached.

Another object resides in the particular construction and arrangement of parts which are hereinafter described and claimed and shown in the accompanying drawings.

The invention is illustrated in the drawings, of which—

Figure 2 is a perspective view of the running gear of the wagon with the body removed; and Figure 3 is a plan view of the running gear.

Figure 1:
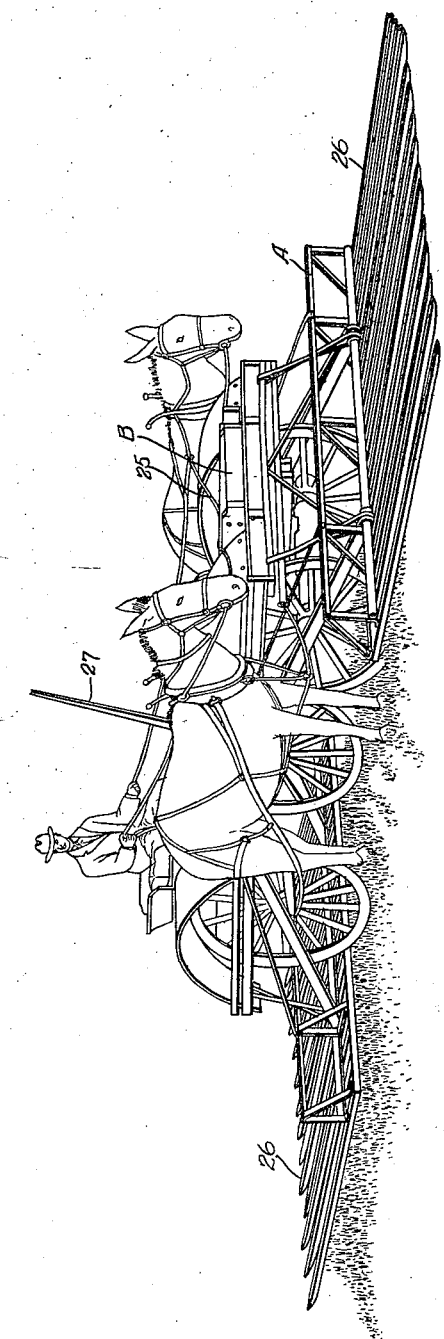
Figure 1 is a perspective view of the farm wagon showing a team, and the farm devices, such as push rakes, disposed at the front and rear of the body of the wagon.

The preferred form of my invention, as shown in the drawings, is especially adapted to be applied to any standard type of farm wagon without any material disarrangement of the structure thereof. As shown in the drawings, I have applied my improved running gear to a wagon having a front and rear axle 1 and 2 with a connecting reach rod or coupling pole 3. The wagon is provided with the usual rear hounds 4 and front hounds 5. The front hounds are extended, as shown particularly in Fig. 3, in the form of two members 6 and 7 which extend forwardly of the front axle 2; and to their front ends there is attached a neck yoke or crossbar 8 which extends completely across the front axle and the wheels. The length of this crossbar or neck yoke 8 is such that the ends thereof extend on each side beyond the line of the tread of the wheels.

Intermediate the coupling pole or reach bar 3 I have provided a long double-tree 9 which is suitably pivoted as at 10 to the reach bar 3 and has on each end thereof single-trees 11 and 12. This double-tree is attached to the coupling pole 3 of the wagon in front of the rear hounds 4. Stay chains 13 and 14 are attached at one end by means of clevises 15 and 16 to the double-tree 9 at equal distances on opposite sides of the pivoted pin thereof. These stay chains 13 and 14 extend forward and the front ends thereof are attached to double stay chain hooks, such as 17 and 18, which are in any suitable manner attached to the lower face of the front axle 2. These double stay chain hooks are disposed on the front axle at equal distances from the pivot pin thereof. The neck yoke 8 is rigidly bolted to the extension members 6 and 7 of the front hounds 5, and ordinary wagon stay chains, such as 19 and 20, are connected at their front ends to clevises 21 and 22 on the neck yoke 8 and at their other ends to the double stay chain hooks 17 and 18 above mentioned. The clevises 21 and 22 are disposed at equal distances on opposite sides of the center of the neck yoke 8. All four of these chains, 13, 14, 19 and 20, are rather tightly adjusted so that the movement of the front axle, in accordance with the pull exerted on the horses under the guidance of the operator, will be sufficiently sensitive.

At each end of the neck yoke I have provided rings, such as 23 and 24, to which the harness of the horses at the front may be attached in any suitable manner. The horses, of course, are connected by means of their traces to the single-trees 11 and 12 in the usual manner. The cross-line checks, such as are indicated by the numeral 25 in Fig. 1, may be extended in length in any well-known manner to reach across the body of the wagon, thus permitting of the guiding of the direction of the team and wagon forward or backward by the manipulation of the lines, as may be readily seen. In Fig. 3 I show in dotted lines the position of the running gear which it assumes when the wagon is being turned.

As shown in Fig. 1, I combine two push rakes with the standard farm wagon to which has been attached the above described running gear, whereby two horses may be disposed at opposite sides of the wagon. These rakes may be of any suitable type but preferably are of the type shown in my Patent No. 1362425, issued December 15, 1920 entitled Hay rakes, as well as in my copending application, Serial No. 428945, filed December 7, 1920, entitled Hay rakes. In either of these constructions which it may be desired to use, the rakes generally comprise a plurality of rake bars 26 which are suitably connected to a frame lettered A, this frame being connected to a body portion such as B by a plurality of truss members, which are clearly shown and described in the above-mentioned patent and application. In accordance with the disclosure in this patent and application, the operator by moving a lever, such as 27, can lower the rake bars 26 to the ground or raise them from the ground to carry a load thereon.

The application of this particular running gear to an ordinary wagon body adapts it not only for use in connection with a pair of rakes as above described but also adapts it for use in connection with any and all farm machinery which can be used at the front and rear of such a wagon. This saves the great expense of a carriage for each machine or device; and an engine may be mounted, although it is not shown on the carriage or body of the wagon, to operate the desired machinery where necessary.

What I claim is:

1. A running gear for wagon bodies having a reach bar and front hounds, which comprises a double-tree pivoted to the reach bar between the wheels of the wagon, and a neck-yoke bar attached to the front hounds and extending across the front of the wheels and front axle.

2. A running gear for wagon bodies having a reach bar and front hounds, which comprises a double-tree pivoted on the reach bar of the wagon between the wheels, a neck yoke bar disposed across the front axle and attached to the front hounds, and connections between the neck yoke and the double-tree whereby the movement of the double-tree will cause the movement of the front axle and wheels.

3. A running gear for wagons, which comprises a double tree disposed on the reach bar of the wagon between the wheels, a front axle, connections between the double-tree and the front axle, hounds connected to the front axle, a portion of said hounds extending forward, a neck yoke attached to said forward hound extensions, and connections between the neck yoke and the front axle.

4. A running gear for a wagon body, which comprises a pivoted double-tree disposed between the wheels, a front axle, and chain connections between the front axle and the double-tree.

5. A running gear for wagons, which comprises a double-tree disposed between the wheels, hounds attached to the front axle, a portion of said hounds extending forwardly of the said axle, a neck yoke attached to said forward extensions, and chain connections between the neck yoke and the front axle.

WESLEY KOUNS.